Nov. 26, 1968　　　D. F. HANNON　　　3,413,171
PROCESS OF MAKING IDENTIFICATION CARDS

Filed July 31, 1967　　　　　2 Sheets-Sheet 1

INVENTOR.
DONALD F. HANNON
BY *Watts, Hoffman,*
　　*Fisher & Heinke*
ATTORNEYS

Nov. 26, 1968    D. F. HANNON    3,413,171
PROCESS OF MAKING IDENTIFICATION CARDS
Filed July 31, 1967    2 Sheets-Sheet 2

INVENTOR.
DONALD F. HANNON
BY *Watts, Hoffmann,*
*Fisher & Heinke*
ATTORNEYS

United States Patent Office 3,413,171
Patented Nov. 26, 1968

3,413,171
PROCESS OF MAKING IDENTIFICATION CARDS
Donald F. Hannon, Willoughby, Ohio, assignor to Laminex Industries, Inc., a corporation of Ohio
Continuation-in-part of application Ser. No. 373,664, June 9, 1964. This application July 31, 1967, Ser. No. 657,120
7 Claims. (Cl. 156—277)

ABSTRACT OF THE DISCLOSURE

A core sheet is coated on both sides with a heat-softenable bonding material to form a core. Identifying indicia is printed on the bonding material and, where desired, an identifying photograph adhered to it. The core is then sandwiched between two sheets of protective covering, each composed of polymerized polyethylene glycol ester and a copolymer. Lamination of the sandwich is effected by roll lamination so that printed indicia on the core and/or the protective covering is disposed between the two then-bonded layers of bonding material.

*Cross references to related application and patent*

This is a continuation-in-part of Ser. No. 373,664, filed June 9, 1964 by Donald F. Hannon under the title Identification Card, now abandoned, in favor of Ser. No. 662,841, filed concurrently herewith and this continuation-in-part is filed as a result of a requirement for restriction in the said Ser. No. 373,664.

Patent 3,309,983 to Dresser entitled, Continuous Plastic Laminator, issued Mar. 21, 1967.

*Background of the invention*

(1) *Field of the invention.*—This invention relates to identification cards and more particularly to a process of making laminated identification cards.

(2) *Prior art.*—The identification card formed by the process of this invention is an improvement of the identification card disclosed in Patent Re. 25,005, issued July 4, 1961, to D. F. Hannon, under the title "Identification Card." The preferred card disclosed in the reissue patent consists of a central paper core upon which a photograph is mounted and identifying indicia is printed. The paper core is sandwiched between two layers of a plastic material sold commercially under the trademark Mylar which layers are bonded to the core by laminae of polyethylene. A grid-like pattern is printed on the inner surface of one of the Mylar layers and superimposed over the photograph.

In U.S. Patent 2,984,030, issued May 16, 1961 to D. F. Hannon, an improvement over the reissue patent is described and claimed wherein the grid is printed at the interface between the photograph and the plastic bonding material and preferably on the plastic bonding material. The purpose of the location of the grid on the bonding material is that if heat is carefully applied to the laminated structure with the heat exactly controlled so that the Mylar does not decompose in any way, but the polyethylene does soften, one is still unable to tamper with the card because the printed grid will be distorted or destroyed.

Cards of these two earlier patents have enjoyed tremendous commercial success and due to this success have been exposed to persons who would choose to tamper with them. With this exposure, artful techniques have been developed where even these cards of these prior patents may have, on occasion, been altered. With the card of the more recent patent made by the process of the present invention, a construction has been devised where even these artful techniques are ineffective. The card is so susceptible to detectable changes resulting from attempts to tamper with the card that many prior known card forming techniques are not satisfactory and it is necessary to use novel processing techniques of this invention for making the card.

*Summary of the invention*

In the preferred construction, a thin paper core sheet is used and a suitable heat softenable resin bonding material is applied to both surfaces of the paper sheet. Identifying indicia is printed on the resin coating and an identifying photograph is adhered to it. This laminated core is then sandwiched between a laminated protective covering consisting of a sheet of Mylar and a resin bonding material of heat softening characteristics identical to the characteristics of the resin bonding material coating the paper core sheet. Where a grid is desired, it is printed on the inner face of this protective covering and oriented over the photograph.

With the resultant card identifying printed photo indicias are suspended in the resin bonding material. Thus, in the finished card, all printed indicia and the photograph are disposed between two layers of thermoplastic bonding material which have been heat bonded together so that the identifying indicias are encased within the bonding material. Any application of heat or solvent to separate the card causes the resin to flow sufficiently to distort and destroy the grid pattern and the printed identifying indicia.

Since the improved structure is highly susceptible to any heat application in the event of tampering, the successful lamination of an identification card presents a problem. It has been discovered that with carefully controlled temperatures and speeds, it is possible to bond the adjacent bonding layers together through the use of rotary lamination without applying heat to an extent which will cause any flow of the identifying printing or the grid.

The objects of this invention are to provide a novel and improved method of making a tamper-proof identification card.

Other objects and a fuller understanding of the invention may be had by referring to the following description and claims taken in conjunction with the accompanying drawings in which:

*Drawing description*

*Description of preferred embodiment*

Figure 1:
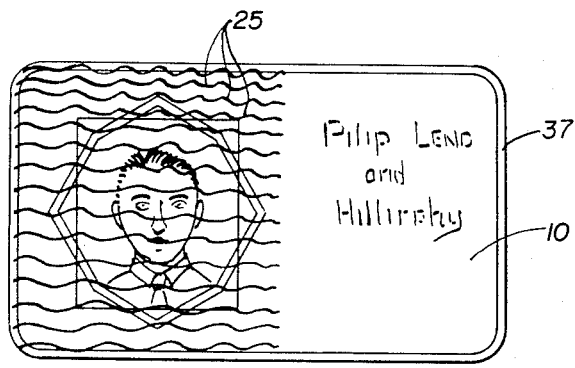
FIGURE 1 is a plan view of the identification card of this invention.
Figure 2:
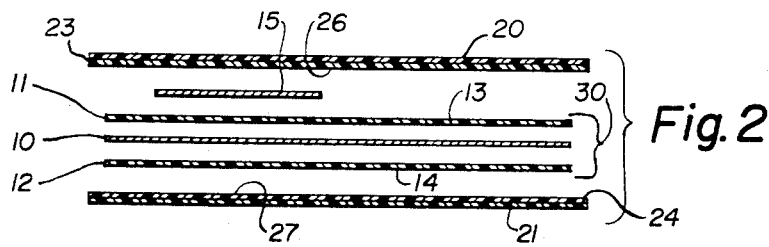
FIGURE 2 is an exploded sectional view of the card.

Referring to FIGURES 1 and 2, the card has a central paper core sheet 10. The principal purposes of the central paper core sheet in the present card are to provide a background for the printed indicia and the photograph, and to provide rigidity and body to the card. It will become apparent from the ensuing discussion that the paper core sheet can be eliminated under certain circumstances, but it is preferred that it be present. The paper core sheet 10 is relatively thin paper preferably of about 16 lbs. weight. The paper is sandwiched between upper and lower inner layers of a resin bonding material 11, 12 preferably polyethylene.

Polyethylene is used herein in a broad sense. It is used in the context of the definition set forth in The Condensed Chemical Dictionary 6th Edition, published 1961 by Reinhold Publishing Corporation, wherein the first paragraph of the definition reads as follows: polyethylene $(C_2H_4)n$—

"Polymerized ethylene, available in various forms, but the white leathery resinous form is by far the most common.

"Description: In general it is light weight, tasteless, odorless, and nontoxic. The low molecular weight polymers are high grade lubricating oils or oil additives (see 'A–C' polyethylenes). The medium weight polymers are waxy materials miscible with paraffin. The high molecular weight materials (molecular weight greater than 6000) are tough white, leathery, resinous materials. The term polyethylene usually refers to the latter. Copolymers of polyethylene are also widely used and are sometimes referred to as polyethylene even though it may comprise only 50% of the total material."

Identifying indicia is printed on outerface 13 of the upper inner layer 11. Further, indicia may be printed on outerface 14 of the lower inner layer 12. An identifying photograph 15 will be adhered to the face 13.

The inner layers 11, 12 and the paper core sheet 10 together comprise a core which is encased within a protective envelope or shell. The envelope includes upper and lower outer protective sheets 20, 21. The protective sheets are flexible, transparent, and tear resistant. The preferred material for these protective sheets is polyester film. The polyester film is a polyethylene glycol ester of terephthalic acid. Expressed another way, the polyester film is polymerized polyethylene glycol ester. This material is sold commercially by the Du Pont de Nemours Company under the trademark "Mylar."

"Mylar" is outstanding for this protective purpose because of its transparency, stability, tremendous tear resistance, high strength, long life, and high degree of imperviousness. It is also outstanding for this purpose because of its tendency to be substantially heat resistant such that if heated to the point where it will flow, the paper core and photograph will tend to become charred. The encompassing envelope formed of these outer protective sheets provides an exterior shell which is extremely smooth. The outer sheets 20, 21 are bonded to the innerlayers 11, 12 by upper and lower outer bonding layers 23, 24 respectively. The outer bonding layers 23, 24 should be of a material identical to the innerlayers 11, 12 at least insofar as the melting point is concerned.

The surfaces 13, 14 are bonding surfaces as are inner surfaces 26, 27 of outer layers 23, 24. The layers are bonded together at two spaced interfaces located respectively by the surfaces 13, 26 and 14, 27. Thus, when the card is finished and the layers are bonded at the two interfaces, printed and photo indicias are suspended within and encased by the polyethylene material. With the printing so positioned, it is maintained in its indicia providing position by the polyethylene. Any heat applied to heat soften any bonding layer will heat soften all of them and cause the printing to flow. For this reason, it is impossible to delaminate the card to remove the photograph without the printed indicia in the bonding layers flowing. The preferred form of the polyethylene material for this purpose is a copolymer composed of relatively low density polyethylene having a density between 0.910 and 0.929 gram per cubic centimeter with from 3% to 10% acrylic acid added. The polyethylene is unmodified and has a melt index of from 2 to 12. Polyethylene is preferred because it has the characteristics of being thermoplastic, transparent, stable, capable of being heated without noticeable degradation (i.e., inert) and capable of forming a bond. The specific copolymer disclosed is preferred because it has been discovered to have outstanding properties for the process disclosed in that it provides superior adhesion.

In the case of the layers 11, 12, the transparency is not essential and it could be colored. If the core polyethylene is colored, a single layer can be substituted for the two layers 11, 12 and the paper core 10. If this paper is eliminated, a relatively high density polyethylene should be used for card rigidity.

In the preferred arrangement, a grid-like pattern 25 is printed on innerface 26 of the upper outer layer 23. This grid pattern 25 is superposed over the photograph 15. It has been found that during the card forming operation of this invention the printing tends to be transferred onto the photograph so that the grid pattern cannot be removed with the bonding layer.

In the manufacture, the core is first formed. One manner of forming the core is to continuously extrude layers of polyethylene on both faces of a web of paper to form a core strip. The core strip thus formed can be severed into individual card cores identified by the numeral 30 in FIGURES 2 and 3. As suggested previously, the cores 30 are each composed of the paper core sheet 10 with the covering of polyethylene and printed indicia on the covering.

Upper and lower coils 31 are mounted on suitable mandrels 32. These coils are webs of a Mylar-polyethylene lamination. These webs are fed in strips 33 which form the outer sheets and layers 20, 21, 23, 24. The strips 33 and the cores 30 are fed between a pair of heated rotary laminating rolls 35 which compress the core and strips together heat softening the polyethylene at the same time to effect a bond. The rollers are spring loaded and abutting when the device is not in use. The rollers are heated to about 220° to 350° preferably about 275°. The temperature will vary according to the bonding material used and the speed at which the plastic is fed. The rollers are rotated at a speed appropriate to feed the strips 33 and the sandwiched cores at a rate of from about 2 to 4.5 feet per minute and preferably about 45 inches per minute. Where the plastic has been preheated, speeds as high as 30 feet per minute can be obtained. After the cards have been laminated together by passing through the rolls, the cards are separated by suitably cutting the plastic between the spaced cores 30. The finished card has a boundary at 37 where the outer layers are adhered together to surround the core sheet 10.

Figure 4:
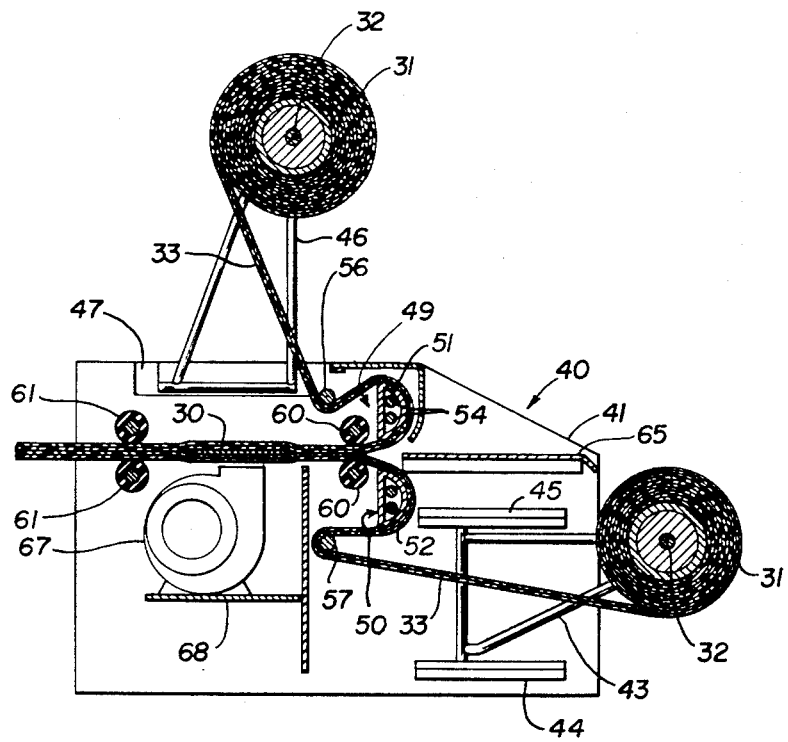

The preferred roll laminator for manufacturing the ID cards of this invention is shown in FIGURE 4. This laminator is described in greater detail in the referenced Patent 3,309,983 to Dresser. There, the laminator is indicated generally by the reference numeral 40. The laminator has a side wall 41 and a second side wall, not shown, which is the mirror image of the side wall 41.

An arm member 43 is pivotally supported by brackets 44, 45. The brackets are secured to the side wall 41. A second arm member, not shown, which is the mirror image of the first is carried by the other side wall. These arm members support the lower one of the mandrels 32.

An upper arm 46 is pivotally mounted on upper bracket 47. The upper bracket 47 is also mounted on the side wall 41. Again, another arm, which is a mirror image of the arm 46, is provided but not shown. These upper arms support the upper one of the mandrels 32.

A pair of shoe heater assemblies 49, 50 are provided. The shoe heater assemblies 49, 50 include platens 51, 52 respectively. The plastic strips 33 are reeved respectively around upper and lower guide bars 56, 57, then respectively over the shoe heaters 49, 50.

The strips are fed from the heaters 49, 50 to the left, as seen in FIGURE 4, between first and second pairs of rubber compression rolls 60, 61. The cores 30 are fed between the strips of plastic 33 at a load station defined by a platform 65.

It has been found that the process may be improved if a blower 67 mounted on a support bracket 68 is provided to cool the bonded laminate at a station between the first pair of rolls 60 and the second pair 61.

Figure 3:
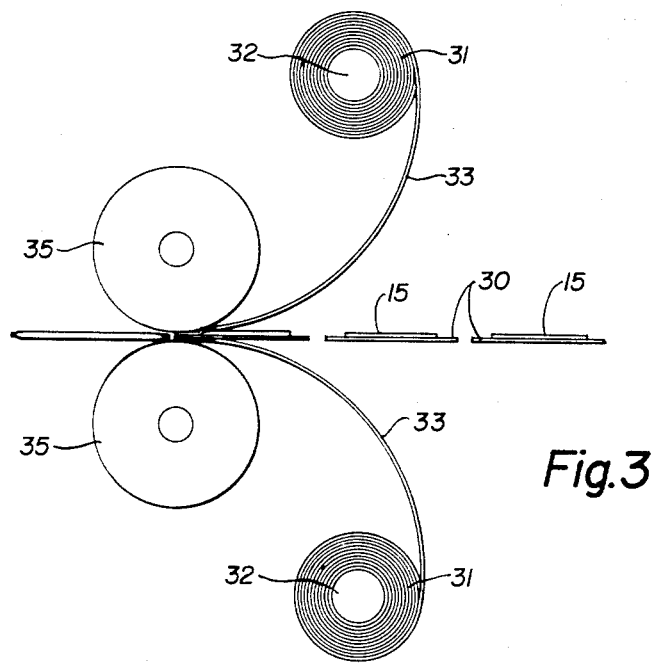
FIGURE 3 is a schematic showing of the card making apparatus and process of making cards; and, FIGURE 4 is a cross-sectional view of the apparatus which is preferred for the card making process.

Good results are obtained with the temperatures indicated above in connection with the schematic structure of FIGURE 3, that is, the shoe heaters 49, 50 should be heated to about 220–350° and preferably about 275° to obtain good results. Feeding speeds of the laminator of FIGURE 4 correspond to those set out above in connection with the schematic showing of FIGURE 3.

In FIGURE 2, the dimensions of the sheets and layers, the photograph and the paper core, are all greatly exaggerated. The thickness of the outer layers varies according to the thickness of the Mylar sheets. These layers are preferably about 4 times as thick as the Mylar sheets. The outer protective sheets 20, 21 are from 1 to 3 mils and preferably of about 1 or 2 mils thickness depending on the rigidity required. For example, a typical wallet card will have 1 mil outer sheets while a typical badge will have 2 mil sheets. The relatively heavy Mylar outer sheets provide resistance to tampering, good wear resistance, and a long lived card.

As noted above, the grid 25 will flow if the card is heated. The grid 25 provides an additional protection. If one seeking to tamper with the card cuts the protective covering around the contour of the photograph and lifts out the photograph, it is substantially impossible to return the photograph to place without the tampering being detected. The grid provides this protection because it is substantially impossible for the tamperer to align a forged grid with the original grid. Moreover, because the grid and other printing are suspended between layers of the polyethylene bonding material, it is not possible to heat adhere a counterfeit photograph in place without causing the printing to flow.

If one attempts to bond a counterfeit photograph in place as by a solvent type adhesive, it is still possible to detect the substituted card because one cannot bond the severed Mylar together. If the severed seam of the Mylar is hidden by solvent adhesive or perhaps an adhesive having a melt index considerably below that of the polyethylene, it is still possible to detect the forgery by flexing the card which causes the Mylar to separate along the cut and expose the cut.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. The process of forming an identification card comprising the steps of:
   (a) forming a core including a heat softenable plastic material defining at least one bonding surface;
   (b) providing first and second outer protective coverings, each comprising an outer protective layer and a bonding layer of a heat softenable plastic material having the same melt index as said core plastic material and each bonding layer having a bonding surface;
   (c) applying indicia to at least one of the bonding surfaces at least some of said indicia being provided by printing with ink; and,
   (d) laminating the coverings to the core to provide a protective envelope by heating and compressing the coverings and the core therebetween by roll lamination and thereby adhering said protective covering bonding surfaces to said core.

2. The process of claim 1 wherein a grid work is printed on at least one of said protective covering bonding surfaces prior to lamination of the card.

3. The process of claim 1 wherein the indicia is applied to said one core bonding surface.

4. The method of claim 1 wherein the core and protective covering plastic materials are polyethylene.

5. The process of manufacturing an identification card comprising:
   (a) forming a core having a core sheet coated on both faces with a heat softenable plastic bonding material;
   (b) applying identifying indicia to an outer face of the core bonding material;
   (c) applying a protective envelope composed of first and second outer sheets of polyethylene glycol ester of terephthalic acid and first and second outer layers of heat softenable bonding material having substantially the same melt index as the bonding material of the core; and,
   (d) laminating the envelope and core together by heating certain of the bonding layers and compressing the envelope and core together with a rotary laminator while said certain layers are heated.

6. The process of claim 5 wherein the melt index is from 2 to 12.

7. The process of forming an identification card comprising the steps of:
   (a) forming a core including a heat softenable plastic material defining at least one bonding surface;
   (b) providing first and second outer protective coverings, each comprising an outer protective layer and a bonding layer of a copolymer of 3% to 10% acrylic acid and polyethylene having a density of from 0.910 to 0.929 gram per cubic centimeter, each bonding layer having a bonding surface;
   (c) applying indicia to at least one of the bonding surfaces at least some of said indicia being provided by ink; and,
   (d) laminating the coverings to the core to provide a protective envelope by heating and compressing the coverings and the core therebetween by roll lamination and thereby adhering said protective covering bonding surfaces to said core.

References Cited
UNITED STATES PATENTS

| | | | |
|---|---|---|---|
| 3,143,454 | 8/1964 | Hannon | 156—499 |
| 3,279,826 | 10/1966 | Rudershausen et al. | 40—2.2 X |

EARL M. BERGERT, *Primary Examiner.*

R. A. KILLWORTH, *Assistant Examiner.*